United States Patent
Thomas

(10) Patent No.: US 6,445,997 B2
(45) Date of Patent: Sep. 3, 2002

(54) CONTROLLER AND STORAGE MEDIUM FOR DETECTING COLD ENGINE OPERATION

(75) Inventor: Eric D. Thomas, Canton, MI (US)

(73) Assignee: Detroit Diesel Corporation, Detroit, MI (US)

( * ) Notice: Subject to any disclaimer, the term of this patent is extended or adjusted under 35 U.S.C. 154(b) by 0 days.

(21) Appl. No.: 09/829,090

(22) Filed: Apr. 9, 2001

Related U.S. Application Data

(62) Division of application No. 09/282,526, filed on Mar. 31, 1999, now Pat. No. 6,243,642.

(51) Int. Cl.⁷ .............................................. G06F 19/00
(52) U.S. Cl. ...................................................... 701/113
(58) Field of Search .............................. 701/113, 102, 701/104; 123/41.1, 41.12, 41.13, 41.31, 41.29, 41.44, 179.15, 179.13, 557

(56) References Cited

U.S. PATENT DOCUMENTS

| | | | |
|---|---|---|---|
| 3,652,065 A | | 3/1972 | Casey et al. |
| 4,114,570 A | | 9/1978 | Marchak et al. |
| 4,248,193 A | * | 2/1981 | Choma et al. .............. 123/350 |
| 4,252,098 A | * | 2/1981 | Tomczak et al. ............ 123/437 |
| 4,393,840 A | * | 7/1983 | Tanaka et al. ......... 123/179.16 |
| 4,399,774 A | | 8/1983 | Tsutsumi |
| 4,408,582 A | * | 10/1983 | Merrick ................. 123/406.46 |
| 4,538,573 A | | 9/1985 | Merrick |
| 4,592,323 A | | 6/1986 | Vest |
| 4,639,871 A | | 1/1987 | Sakai et al. |
| 4,688,534 A | | 8/1987 | Takeda et al. |
| 4,724,808 A | | 2/1988 | Kadota |
| 4,805,574 A | | 2/1989 | Sakamoto et al. |
| 4,825,829 A | | 5/1989 | Abe |
| 4,961,404 A | | 10/1990 | Itakura et al. |
| 5,018,484 A | | 5/1991 | Naitoh |
| 5,027,771 A | | 7/1991 | Daikoku et al. |
| 5,069,084 A | | 12/1991 | Matsuno et al. |
| 5,293,741 A | | 3/1994 | Kashiyama et al. |
| 5,299,630 A | | 4/1994 | Schatz |
| 5,367,996 A | | 11/1994 | Homik et al. |
| 5,398,502 A | | 3/1995 | Watanabe |
| 5,526,871 A | * | 6/1996 | Musser et al. ............. 73/117.3 |
| 5,535,711 A | | 7/1996 | Kach |
| 5,626,117 A | | 5/1997 | Wright et al. |
| 5,735,238 A | | 4/1998 | Russ et al. |
| 5,781,877 A | | 7/1998 | Rachel et al. |
| 6,152,107 A | * | 11/2000 | Barnes et al. .......... 123/179.17 |
| 6,243,642 B1 | * | 6/2001 | Thomas ...................... 701/113 |

FOREIGN PATENT DOCUMENTS

JP          06117259          4/1994

* cited by examiner

Primary Examiner—Lesley D. Morris
Assistant Examiner—Hieu T. Vo
(74) Attorney, Agent, or Firm—Brooks & Kushman P.C.

(57) ABSTRACT

An engine controller and computer readable storage medium for detecting cold engine operation include determining at least two fluid temperatures and providing an output signal based on the at least two temperatures. Preferably, an engine coolant temperature, an intercooler temperature, and an engine air temperature are determined via appropriate temperature sensors. In one embodiment, the cold engine output signal is activated or asserted if any one of the at least two fluid temperatures is below a corresponding temperature threshold. The cold engine output signal is deactivated when all of the fluid temperatures are above corresponding temperature thresholds (plus hysteresis where applicable). An optional user-selectable parameter provides for actuation of the cold engine output only during idle. The cold engine output signal may be used to control various accessories including coolant heating systems, shutters, or the like. Additional parasitic loads or an exhaust brake may be actuated to increase combustion temperatures by increasing engine load to reduce or eliminate white smoke.

16 Claims, 2 Drawing Sheets

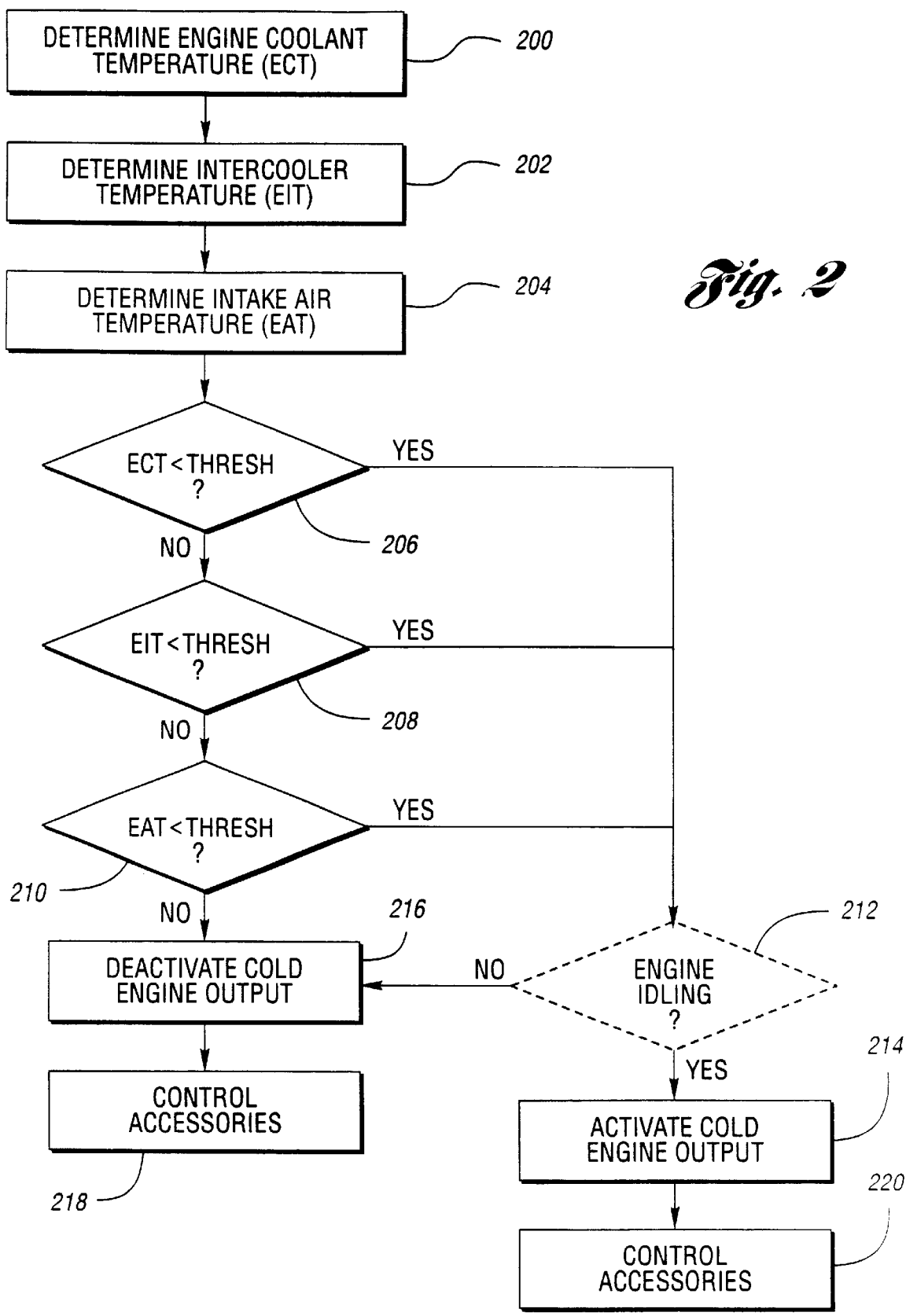

US 6,445,997 B2

CONTROLLER AND STORAGE MEDIUM FOR DETECTING COLD ENGINE OPERATION

CROSS-REFERENCE TO RELATED APPLICATION

This application is a divisional application of U.S. Ser. No. 09/282,526 filed Mar. 31, 1999, now U.S. Pat. No. 6,243,642 issued Jun. 5, 2001, the disclosure of which is hereby incorporated by reference in its entirety.

TECHNICAL FIELD

The present invention relates to a system and method for detecting a cold engine state using a plurality of engine temperatures.

BACKGROUND ART

In the control of internal combustion engines, the conventional practice utilizes electronic control units, volatile and non-volatile memory, input and output driver circuitry, and a processor capable of executing a stored instruction set, to control the various functions of the engine and its associated systems. A particular electronic control unit communicates with numerous sensors, actuators, and other control units necessary to effect various control and information functions of the engine and/or vehicle.

Various sensors are used to detect engine operating parameters which may affect control of the engine and/or vehicle. However, many engine operating parameters or conditions are not directly measured or sensed due to the associated cost and/or availability of suitable sensors relative to the perceivable improvement in engine control. These parameters or conditions may be sensed or measured indirectly by sensing a related process or parameter using other sensors, or may be calculated or inferred. For example, torque sensors, while available, are not often used in vehicular applications. Likewise, it may be desirable to determine peak combustion temperature or pressure to improve the efficiency and reduce emissions related to the combustion process. As is known, lower than optimal combustion temperatures may result in white smoke while higher combustion temperatures result in increased production of oxides of nitrogen, and may result in engine damage if excessive. However, the harsh environment present within the cylinders is generally not amenable to temperature and/or pressure sensors for production use.

Temperature sensors are commonly used to detect the temperature of various engine and/or vehicle fluids (including air) to control associated engine components, including valves, heaters, shutters, and various other mechanisms. As is known, ambient and operating temperature variations may present a number of challenges in controlling the engine. Temperature-related complications may include fuel coagulation, insufficient coolant circulation, and increased exhaust emissions, among others. Conventional engine systems use the engine coolant temperature or engine oil temperature to activate various engine mechanisms in an effort to improve engine performance. However, a single fluid temperature measurement is not necessarily indicative of the current engine operating conditions which may be used to control one or more engine and/or vehicle devices. As such, it would be desirable to provide a system and method for detecting a cold engine based on signals from a plurality of engine temperature sensors.

DISCLOSURE OF INVENTION

It is therefore an object of the present invention to provide a method and system for detecting cold engine operation based on a plurality of engine fluid temperatures.

Another object of the present invention is to provide a system and method for detecting cold engine operation based on at least two fluid temperatures selected form the group including coolant temperature, intercooler temperature, and engine air temperature.

Another object of the present invention is to provide a system and method for providing a signal indicating cold engine operation only while the engine is idling.

An additional object of the present invention is to provide a cold engine output signal used to control one or more auxiliary devices based on a plurality of engine fluid temperatures.

A further object of the present invention is to provide a system and method for increasing combustion temperature when cold engine operation is detected by increasing parasitic loads on the engine.

A still further object of the present invention is to reduce or eliminate white smoke by activating one or more auxiliary devices to increase engine power resulting in increased combustion temperatures when cold engine operation is detected.

Yet another object of the present invention is to provide a customer configurable cold engine output signal based on a plurality of fluid temperatures.

A further object of the present invention is to provide a cold engine output signal based on a plurality of fluid temperatures each having corresponding temperature thresholds which can be used to adjust the sensitivity of the signal to any one or more of the constituent fluid temperatures.

In carrying out the above objects and other objects and features of the present invention an engine controller and computer readable storage medium include instructions for detecting cold engine operation and providing a cold engine output signal for use in engine and/or vehicle control by determining at least two fluid temperatures and providing an output signal based on the at least two temperatures. Preferably, an engine coolant temperature, an intercooler temperature, and an engine air temperature are determined via appropriate temperature sensors. In one embodiment, the cold engine output signal is activated or asserted if any one of the at least two fluid temperatures is below a corresponding temperature threshold. The cold engine output signal is deactivated when all of the fluid temperatures are above corresponding temperature thresholds (with appropriate hysteresis). An optional user-selectable parameter provides for actuation of the cold engine output only during idle.

A system for detecting cold engine operation and providing a cold engine output signal for use in engine control includes a plurality of engine temperature sensors for providing an indication of corresponding fluid temperatures. Preferably, the temperature sensors include an engine coolant temperature sensor for measuring an engine coolant temperature, an intercooler temperature sensor for measuring an intercooler temperature, and an engine air temperature sensor for measuring an engine air temperature. The system also includes a microprocessor in communication with the temperature sensors for determining whether at least one of the temperatures is below a corresponding temperature threshold. The electronic control unit includes control logic for generating a cold engine output signal if any of the fluid temperatures is below its corresponding temperature threshold. The electronic control unit also includes control logic for deactivating or de-energizing the cold engine output signal when all of the fluid temperatures are above their corresponding temperature thresholds. Optional control logic activates the cold engine output only when a cold engine condition is detected and the idle governor is active, i.e. the engine is idling.

The advantages accruing to the present invention are numerous. For example, the present invention enables the engine controller to more accurately detect cold engine operation to activate various engine and/or vehicle mechanisms based on the cold engine status. The present invention may be used to reduce white smoke caused by lower than desired combustion temperatures by detecting cold engine operation and controlling auxiliary devices to increase engine load to increase combustion temperatures. Multiple temperature sensors with corresponding programmable thresholds provide increased control versatility by providing a system which can activate cold engine start mechanisms such as coolant heating systems, extra parasitic loads, shutters or exhaust (engine) brakes. Independently selectable temperature thresholds or limits may be used to adjust the response of the cold engine output based on one or more of the constituent fluid temperatures.

The above objects and other objects, features, and advantages of the present invention are readily apparent from the following detailed description of the best mode for carrying out the invention when taken in connection with the accompanying drawings.

BRIEF DESCRIPTION OF DRAWINGS

FIG. 2 is a block diagram illustrating operation of a system or method according to the present invention for detecting a cold engine state, and generating a cold engine output signal.

BEST MODE FOR CARRYING OUT THE INVENTION

Figure 1:
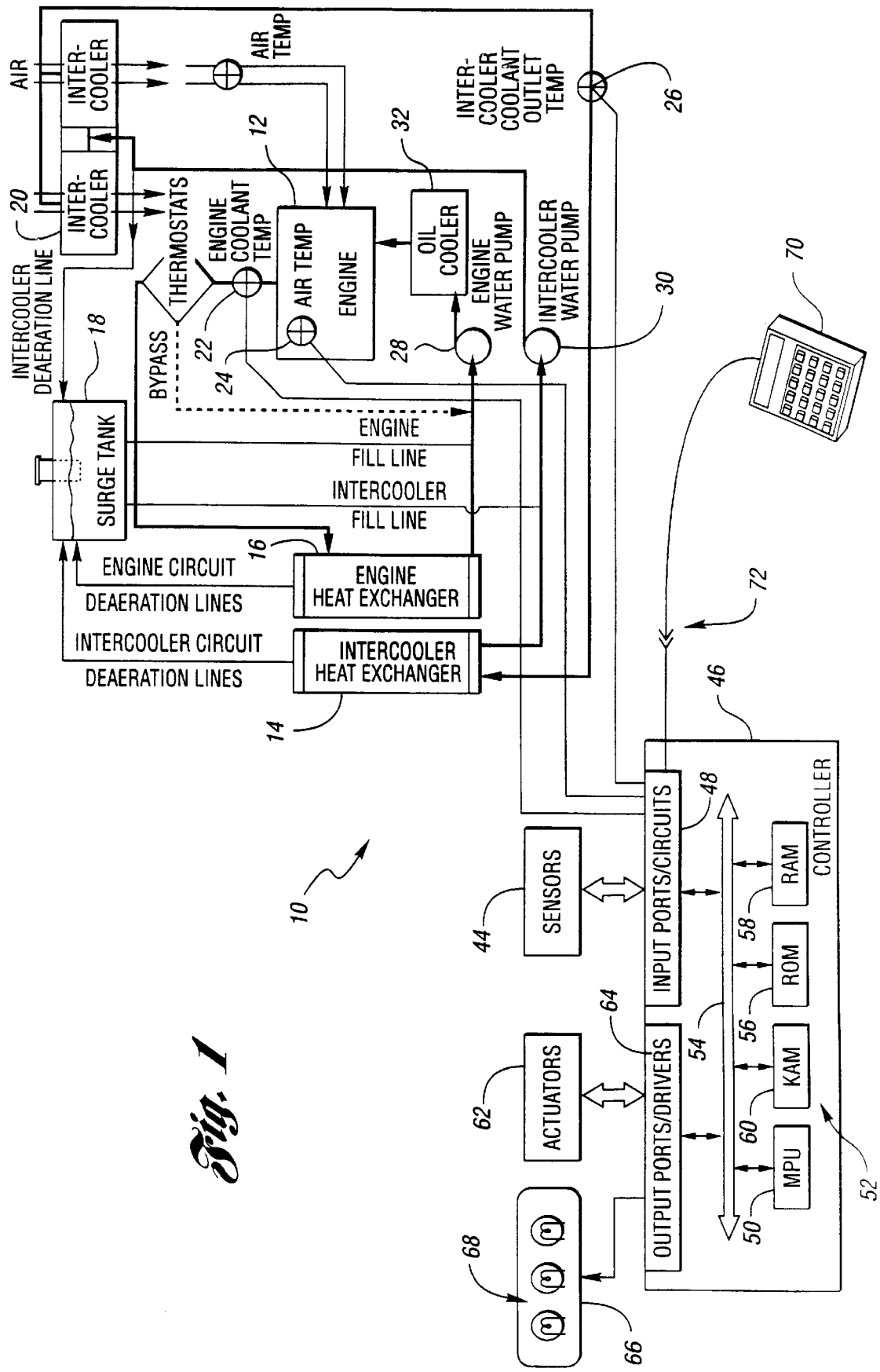
FIG. 1 is a schematic diagram of one embodiment for a cold engine detection system based on engine coolant temperature, intercooler temperature, and engine air temperature according to the present invention.

Referring now to FIG. 1, a system for detecting cold engine operation based on at least two fluid temperatures according to the present invention is shown. Preferably, the at least two fluid temperatures are selected and may include the coolant temperature, intercooler temperature, and engine air temperature. The system, generally indicated by reference numeral 10, includes an engine 12 having a plurality of cylinders. In a preferred embodiment, engine 12 is a multi-cylinder compression ignition internal combustion engine, such as a four, six, eight, twelve, sixteen or twenty-four cylinder diesel engine, for example. The system further includes an intercooler 20 with an associated intercooler heat exchanger 14, an engine coolant heat exchanger 16, and a coolant surge tank 18. While an air-to-fluid charge cooling system is illustrated in FIG. 1, the present invention is equally applicable to an air-to-air charge cooling system.

As also illustrated in FIG. 1, system 10 includes an engine coolant temperature sensor 22, an engine air temperature sensor 24, an intercooler temperature sensor 26, an engine water pump 28, an intercooler water pump 30, and an engine oil cooler 32.

Intercooler 20 extracts heat from charge air which is compressed (and thereby heated) by a conventional turbocharger (not shown). An appropriate cooling fluid or coolant absorbs heat from intercooler 20 and is circulated through intercooler heat exchanger 14 via intercooler water pump 30. Engine coolant heat exchanger 16 removes heat from the engine coolant using a conventional heat exchanger configuration as well known in the art. Coolant surge tank 18 is connected to both the intercooler heat exchanger 14 and engine coolant heat exchanger 16 via corresponding fill lines to maintain a desired fluid level within the system while providing overflow protection. Preferalbly, a temperature transducer 22 measures the engine coolant temperature as the coolant exits the engine. This location typically exhibits the maximum temperature of the engine coolant temperature relative to all other points within the cooling circuit.

Engine air temperature transducer 24 measures temperature of the air being drawn into the intake manifold. Intercooler temperature transducer 26 measures the temperature of the intercooler coolant as it exits intercooler 20. This point in the intercooler cooling circuit generally represents the maximum intercooler coolant temperature within the circuit. Engine coolant water pump 28 circulates the engine coolant through the engine block and through the engine coolant heat exchanger 16. Similarly, intercooler water pump 30 circulates the coolant through the intercooler lines connecting intercooler heat exchanger 14 with the intercooler heat exchanger 20.

System 10 may also includes various other sensors 44 for generating signals indicative of corresponding engine conditions or parameters of engine 12 or of the vehicle (not shown). Sensors 44 may include appropriate sensors for providing signals indicative of boost pressure, oil-temperature, oil pressure, oil level, fuel pressure, vehicle speed, and coolant level. Likewise, various switches connected to an operator interface may be provided to select various optional engine operating modes including stop engine override, selection and setting of cruise control, and the like. Engine and/or vehicle operating parameters or conditions may also be calculated, determined, or inferred based on one or more of the sensed parameters for operating conditions indicated by sensors 44.

Sensors 44 are in electrical communication with a controller 46 via input ports and/or conditioning circuitry 48. A preferred embodiment of controller 46 includes a DDEC controller available from Detroit Diesel Corporation, Detroit, Mich. Various other features of this controller are described in detail in U.S. Pat. Nos. 5,477,827 and 5,445,128, the disclosures of which are hereby incorporated by reference in their entirety. Controller 46 preferably includes a microprocessor 50 in communication with various computer readable storage media 52 via data and control bus 54. Computer readable storage media 52 may include any number of known devices which function as a read only memory (ROM) 56, random access memory (RAM) 58, keep alive memory (KAM) 60 and the like. The computer readable storage media may be implemented by any of a number of known physical devices capable of storing data representing instructions executable via a computer such as controller 46. Known devices may include but are not limited to, PROM, EPROM, EEPROM, flash memory, and the like in addition to magnetic, optical, and combination media capable of temporary or permanent data storage.

Computer readable storage media 52 include data representing program instructions (software), calibrations, operating variables and the like used in conjunction with associated hardware to effect control of various systems and subsystems of the vehicle, such as engine 12. Controller 46 receives signals from sensors 44 via input ports 48 and generates output signals which may be provided to various actuators 62 and/or components via output ports 54. Signals may also be provided to a display device 66 which may include various indicators such as lights 68 to communicate information relative to system operation to the operator of the vehicle. Of course, alphanumeric, audio, video, or other displays or indicators may be utilized if desired.

With continuing reference to FIG. 1, control logic implemented by controller 46 and associated hardware and/or software is used to detect cold engine operation according to the present invention. In a preferred embodiment, the control logic implemented by controller 46 detects cold engine operation based on at least two fluid temperatures and corresponding programmable or selectable temperature thresholds. Preferably, controller 46 determines whether the coolant temperature as indicated by the coolant temperature sensor or transducer 22, the engine air temperature as indicated by engine air temperature sensor or transducer 24, and the intercooler temperature as indicated by the inter cooler temperature sensor or transducer 26 have exceeded their respective predefined temperature thresholds. As will be appreciated by one of ordinary skill in the art, control logic according to the present invention is preferably implemented by a programmed microprocessor operating as described in detail below. However, various alternative hardware and/or software may be used to implement the control logic without departing from the spirit or scope of the present invention.

A data, diagnostics, and programming interface 70 may be selectively connected to controller 46 via a connector 72 to exchange various information between controller 46 and the operator and/or service personnel. Interface 70 may be used to change values within the computer readable storage media 52, such as configuration settings, calibration variables, look-up table values, control logic, and the like. For example, interface 70 may be used to program or select temperature thresholds for each of the monitored fluid temperatures to detect cold engine operation according to the present invention.

In operation, engine coolant temperature transducer 22 measures the engine coolant temperature, engine air temperature transducer 24 measures the intake manifold air temperature, and intercooler temperature transducer 26 measures the intercooler coolant temperature. Controller 46 determines whether the engine coolant temperature threshold, the air temperature threshold and the intercooler coolant temperature threshold have been exceeded. If controller 46 determines that the engine coolant temperature, engine air temperature or the intercooler coolant temperature are below their associated temperature thresholds, controller 46 activates (or energizes or asserts) the cold engine output signal which is preferably a digital or binary output signal which may be asserted high or low depending upon the particular application. The cold engine output signal is provided by controller 46 to actuate various mechanisms based on cold engine operation. Such mechanisms or devices may include coolant heating systems, extra parasitic loads, shutters, or exhaust brakes, for example. The temperature thresholds for the monitored fluid temperatures are preferably calibrated independently such that the sensitivity of the cold engine operation signal to any one or more of the parameters may be adjusted depending on the particular application.

In a preferred embodiment of the present invention, cold engine operation is indicated when any one of the monitored fluid temperatures is below its associated temperature threshold. For example, if any one of the engine coolant temperature, the intercooler temperature or the engine air temperature is below its associated threshold, cold engine operation is indicated and an appropriate signal is provided. While calibrations will vary by application, typical threshold values for coolant temperature, intercooler temperature, and engine air temperature are −5° F., 10° F., and 32° F., respectively. However, in one embodiment of the present invention, each of the temperature thresholds may be set to any value between −40° F. and 215° F. since one byte of memory is allocated to each calibration and scaled accordingly. To prevent rapid oscillation of the cold engine operation signal when the temperatures are near their threshold, a hysteresis value is provided. Preferably, a common hysteresis parameter is used for all of the monitored fluid temperatures although individual hysteresis parameters could be provided if desired based on the relative time response of the temperature variations of the monitored fluid. In one embodiment of the present invention, the hysteresis value is allocated a single byte of memory and may be set to any value between 0 and 255. In this embodiment, when controller 46 determines that all of the monitored fluid temperatures are above their corresponding thresholds plus the hysteresis term, cold engine operation is no longer indicated and the output is not asserted. As indicated above, this output may be used to control various engine or vehicle accessories. Controller 46 also determines whether any one of the monitored fluid temperatures is below its corresponding temperature threshold activate the cold engine output.

Referring now to FIG. 2, a flow chart illustrating operation of a system or method for detecting cold engine operation according to the present invention is shown. As will be appreciated by one of ordinary skill in the art, the flow chart represents control logic which may be implemented or effected in hardware, software, or a combination of hardware and software. The various functions are preferably effected by a programmed microprocessor such as the DDEC controller, but may include one or more functions implemented by dedicated electric, electronic, or integrated circuits. As will also be appreciated, the control logic may be implemented using any one or a number of known programming and processing techniques or strategies, and is not limited to the order or sequence illustrated here for convenience only. For example, interrupt or event driven processing is typically employed in real time control applications, such as control of the vehicle engine or transmission. Likewise, parallel processing, multitasking, or multithreaded systems and methods may be used to accomplish the objectives, features, and advantages of the present invention. The present invention is independent of the particular programming language, operating system, processor, or circuitry used to implement the control logic illustrated.

With continuing reference to FIG. 2, engine coolant temperature (ECT) is determined as represented by block 200. Engine intercooler temperature (EIT) is determined as represented by block 202 while engine air temperature (EAT) is determined as represented by block 206. ECT is compared to a corresponding engine coolant temperature threshold as represented by block 206. If ECT is above the engine coolant temperature threshold, control passes to block 208 where controller 46 determines whether EIT is below its corresponding threshold. EAT is then tested in a similar manner as represented by block 210. If any of the monitored fluid temperatures represented by blocks 206, 208, and 210 is below its corresponding threshold, control passes to an optional step represented by block 212 which determines whether the engine is idling. In one embodiment of the present invention, an option or status bit is used to activate or deactivate the logic which determines whether the cold engine output is activated only when the engine is idling. That is, if the status bit is selected, a cold engine output signal will be generated only if one of the monitored fluid temperatures is below its corresponding threshold and the engine is at idle. The idle condition may be determined based on the active governor being the idle governor and/or based on the position of the accelerator pedal. If the idle logic is activated and the engine is idling, or if the idle logic is deactivated, the cold engine output is asserted as represented by block 214. Of course, if the idle logic is activated and the engine is not idling, the cold engine output will not be asserted as represented by block 216. The cold engine output may be used to control one or more engine and/or vehicle accessories as represented by blocks 218 and 220. The process repeats continuously while the engine is running as the microprocessor continues to execute the instructions and re-evaluate the engine operating conditions.

With continuing reference to FIG. 2, when all of the monitored fluid temperatures are above their corresponding temperature thresholds (plus hysteresis where applicable) as determined by blocks 206, 208, and 210, the cold engine output is deactivated as represented by block 216. The cold engine output signal is then used to control the associated engine and/or vehicle accessories as represented by block 220. As described above, the accessories controlled by the cold engine output signal may include coolant heating systems, extra parasitic loads, shutters, exhaust brakes, and the like.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An engine controller including a computer readable storage medium having stored data representing instructions for detecting cold engine operation of an internal combustion engine including a plurality of sensors for detecting a corresponding plurality of fluid temperatures in communication with an engine control module having stored temperature thresholds associated with the fluid temperatures, the engine controller determining a plurality of fluid temperatures using at least one of the plurality of sensors, comparing each of the plurality of fluid temperatures to a corresponding fluid temperature threshold, and generating a cold engine output signal until every one of the plurality of fluid temperatures is above its corresponding fluid temperature threshold.

2. The engine controller of claim 1 wherein the plurality of fluid temperatures includes at least two fluid temperatures selected from: coolant temperature, intercooler temperature, and engine air temperature.

3. The engine controller of claim 1 wherein the controller compares each of the plurality of fluid temperatures to a corresponding fluid temperature plus a hysteresis term to prevent rapid oscillation of the cold engine output signal.

4. The engine controller of claim 1 wherein the plurality of fluid temperatures comprises engine coolant temperature, intercooler temperature, and engine air temperature.

5. The engine controller of claim 1 wherein the controller is connected to at least one accessory to control the accessory based on the output signal.

6. The engine controller of claim 1 wherein the controller activates at least one auxiliary device using the output signal to increase combustion temperatures within the engine by increasing engine load.

7. The engine controller of claim 1 wherein the controller determines whether the engine is idling and generates the output signal only while the engine is idling.

8. A system for detecting cold engine operation and providing a cold engine output signal for use in engine or vehicle control, the system comprising:

a first temperature sensor for measuring a corresponding first engine fluid operating temperature;

a second temperature sensor for measuring a second engine fluid operating temperature; and a controller in communication with the first and second temperature sensorssor, the controller including instructions for comparing at least two temperatures to corresponding programmable thresholds and generating a cold engine output signal when any of the temperatures is below its corresponding threshold.

9. The system of claim 8 wherein the first and second sensors are selected from an engine coolant sensor, an intercooler sensor, and an engine air sensor.

10. The system of claim 8 wherein the controller includes instructions for determining whether the engine is idling and generating the output signal only while the engine is idling.

11. The system of claim 8 further comprising:

an auxiliary device coupled to the engine, wherein the output signal controls activation of the auxiliary device.

12. The system of claim 8 wherein the first and second sensors comprise an engine coolant sensor and an air temperature sensor, the system further comprising:

an intercooler temperature sensor in communication with the controller, wherein the controller includes instructions for generating the output signal until the engine coolant sensor, the air temperature sensor, and the intercooler temperature sensor are above corresponding temperature thresholds.

13. A computer readable storage medium having stored data representing instructions for detecting cold engine operation of an internal combustion engine including a plurality of sensors for detecting a corresponding plurality of fluid temperatures in communication with an engine control module having stored temperature thresholds associated with the fluid temperatures, the computer readable storage medium comprising:

instructions for determining a plurality of fluid temperatures using at least one of the plurality of sensors;

instructions for comparing each of the plurality of fluid temperatures to a corresponding fluid temperature threshold; and instructions for generating a cold engine output signal indicative of cold engine operation when any one of the plurality of fluid temperatures is below its corresponding fluid temperature threshold.

14. The computer readable storage medium of claim 13 wherein the instructions for comparing a plurality of fluid temperatures includes at least two fluid temperatures selected from: coolant temperature, intercooler temperature, and engine air temperature.

15. The computer readable storage medium of claim 13 wherein the instructions for comparing comprise instructions for comparing each of the plurality of fluid temperatures to a corresponding fluid temperature plus a hysteresis term to prevent rapid oscillation of the cold engine output signal.

16. The computer readable storage medium of claim 13 wherein the plurality of fluid temperatures comprises engine coolant temperature, intercooler temperature, and engine air temperature.

* * * * *

UNITED STATES PATENT AND TRADEMARK OFFICE
CERTIFICATE OF CORRECTION

PATENT NO.   : 6,445,997 B2
DATED        : September 3, 2002
INVENTOR(S)  : Eric D. Thomas It is certified that error appears in the above-identified patent and that said Letters Patent is hereby corrected as shown below:

<u>Column 8,</u>
Line 10, please replace "sensorssor" with -- sensors --.

Signed and Sealed this

Eleventh Day of February, 2003

JAMES E. ROGAN
*Director of the United States Patent and Trademark Office*